US010129025B2

(12) United States Patent
McCallum et al.

(10) Patent No.: US 10,129,025 B2
(45) Date of Patent: Nov. 13, 2018

(54) BINDING DATA TO A NETWORK IN THE PRESENCE OF AN ENTITY WITH REVOCATION CAPABILITIES

(71) Applicant: Red Hat, Inc., Raleigh, NC (US)

(72) Inventors: Nathaniel McCallum, Raleigh, NC (US); Robert J. Relyea, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 229 days.

(21) Appl. No.: 15/268,883

(22) Filed: Sep. 19, 2016

(65) Prior Publication Data

US 2018/0083778 A1   Mar. 22, 2018

(51) Int. Cl.
| | | |
|---|---|---|
| *H04L 29/06* | (2006.01) | |
| *H04L 9/32* | (2006.01) | |
| *H04L 9/08* | (2006.01) | |
| *H04L 9/30* | (2006.01) | |
| *H04L 9/14* | (2006.01) | |
| *G06F 7/04* | (2006.01) | |
| *G06F 17/30* | (2006.01) | |

(52) U.S. Cl.
CPC .......... *H04L 9/0897* (2013.01); *H04L 9/0877* (2013.01); *H04L 9/14* (2013.01); *H04L 9/304* (2013.01); *H04L 9/3033* (2013.01); *H04L 9/3226* (2013.01); *H04L 63/06* (2013.01)

(58) Field of Classification Search
None
See application file for complete search history.

(56) References Cited

U.S. PATENT DOCUMENTS

| | | | | |
|---|---|---|---|---|
| 5,799,086 | A * | 8/1998 | Sudia | G06Q 20/02 380/286 |
| 7,328,344 | B2 * | 2/2008 | Chang | G06Q 20/401 380/277 |
| 7,373,517 | B1 | 5/2008 | Riggins | |
| 7,418,596 | B1 | 8/2008 | Carroll et al. | |
| 7,447,903 | B2 | 11/2008 | Sandhu et al. | |
| 7,487,353 | B2 | 2/2009 | Pryor et al. | |

(Continued)

OTHER PUBLICATIONS

Athaniel McCallum, GitHub, "Tang binding daemon", Jan. 29, 2016 GitHub, Inc., 6 pages (https://github.com/npmcoallum/tang).

*Primary Examiner* — Eric Chen
(74) *Attorney, Agent, or Firm* — Lowenstein Sandler LLP (57) ABSTRACT

Implementations of the disclosure provide for binding data to a network in the presence of an entity with revocation capabilities. A cryptographic system is provided that includes a memory to store revocation information comprising a plurality of identifiers and a processing device operatively coupled to the memory. A provisioning public key is recovered in view of a first intermediate public key associated with a client device storing encrypted data. A binding identifier is generated for the client device in view of the provisioning public key. It is determined whether access to the encrypted data associated with the binding identifier is revoked or allowed in view of the revocation information. Responsive to determining that the access is allowed, provide a second intermediate public key to derive an encryption key to access the encrypted data in view of at least the provisioning public key and the first intermediate public key.

21 Claims, 5 Drawing Sheets

(56) References Cited

U.S. PATENT DOCUMENTS

| | | | |
|---|---|---|---|
| 7,707,642 B1 * | 4/2010 | Herbach | G06F 17/30011 |
| | | | 726/27 |
| 8,131,996 B2 * | 3/2012 | Durand | H04L 9/3268 |
| | | | 713/150 |
| 8,495,366 B2 | 7/2013 | Banerjee et al. | |
| 8,582,777 B2 | 11/2013 | Urivskiy et al. | |
| 8,707,043 B2 | 4/2014 | Wason et al. | |
| 9,281,948 B2 * | 3/2016 | Hallin | H04L 9/3268 |
| 9,621,355 B1 * | 4/2017 | Ochmanski | H04L 9/3247 |
| 9,736,145 B1 * | 8/2017 | Hayes | H04L 63/0823 |
| 2015/0281193 A1 | 10/2015 | Zheng | |

* cited by examiner

BINDING DATA TO A NETWORK IN THE PRESENCE OF AN ENTITY WITH REVOCATION CAPABILITIES

TECHNICAL FIELD

The disclosure is generally related to cryptographic computing security, and more particularly, to binding data to a network in the presence of an entity with revocation capabilities.

BACKGROUND

Cryptographic systems are widely used to protect data used in communication networks. Various mechanisms have been proposed to accomplish this purpose and to defend against third-party hackers. Some systems encrypt data according to a cryptographic encryption key. In this regard, a key escrow is a system that may be used to hold in escrow the encryption keys to decrypt and encrypt the data so that, under certain circumstances, an authorized party may gain access to those keys.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Implementations of the disclosure describe binding data to a network in the presence of an entity (e.g., communications device) with revocation capabilities. The presence of the entity on a certain network may be indicated by entity performing certain steps on behalf of the client. The techniques of the disclosure may be used to protect encrypted data "at rest" (e.g., inactive data that is stored physically) on a client device between access requests, and only makes that data available when the entity has performed the certain steps on behalf of the client device. In some communication networks, an encryption key can be used to protect encrypted data. For example, an encryption key may be generated to encrypt data stored on a client device. Subsequently, the encryption key may be used to decrypt the data for access by the client device. In this regard, the encryption key protects the data on the client device from being accessed by, for example, unauthorized parties or system hackers as well as other types of unauthorized access to the data.

In some situations, a remote server, also known as an "escrow", may be used to store the encryption key. Thereafter, the client device may request access to the key from the remote server. Once the client device is authenticated, the remote server may transmit the encryption key to the client device for purposes of accessing the encrypted data. In such cases, however, access to data by the client device cannot be accomplished when the client device is offline because the encryption key is stored at the remote server. In this regard, all transfers of the encryption key from the remote server should occur within an encrypted channel, which adds a layer of complexity and a possible compromise point for the encryption keys. In addition, when an escrow is utilized, the remote server has to perform authentication to enable an authorized party to access the keys. Furthermore, the remote server should maintain a secure state that includes backup redundancies, which can adversely impact system performance as well as provide a centralized location for potential attack by hackers.

In accordance with the disclosure, implementations provide for the encryption/decryption of data on a client device when the client device is in the presence of a communications device (e.g., an access point device, communications beacon, etc.). Presence may refer to the communications device performing certain steps on behalf of the client device so that the client can recalculate an encryption key. In this regard, the client device preforms a recalculation of the encryption key without performing an exchange of sensitive key information with the communications device.

In some implementations, the communications device may determine whether to perform the particular steps on behalf of the client device. For example, in accordance with a centralized revocation mechanism, the communications device may check if the client device is on a revocation list. The revocation list indicates whether the client device's ability to recalculate the encryption key is revoked or allowed. In some implementations, the centralized revocation mechanism may include an interface that allows a user, such as a system administrator, to update a revocation list with an identifier of the client device.

If the client device is moved from the presence of the communications device (e.g., off a certain network associated with the communications device), the communications device cannot perform certain steps on behalf of the client device. Thus, the client device in such situations is unable to recalculate the encryption key in order to access the encrypted data stored thereon.

In accordance with implementations, by providing techniques for a client device to recalculate an encryption key, the encryption/decryption of data associated with the client device can be conducted without performing an exchange of the encryption key, such as from an escrow. Because the communications device is not exchanging encryption keys with the client device and does not contain any sensitive data, the communications device does not have to be authenticated or backed-up, thereby improving system performance and lowering network overhead. Another advantage of the techniques of implementations disclosed herein is that data security is improved by helping to secure data on the client device and the encryption key for that data from certain attacks by hackers.

In some implementations, a centralized revocation mechanism is also provided to revoke the client device's ability to recalculate the encryption key to access the encrypted data. One advantage of the centralized revocation mechanism is to further protect the data on the client device from being compromised by an unauthorized user, for example, in situations in which the client device is either lost or stolen.

Figure 1:
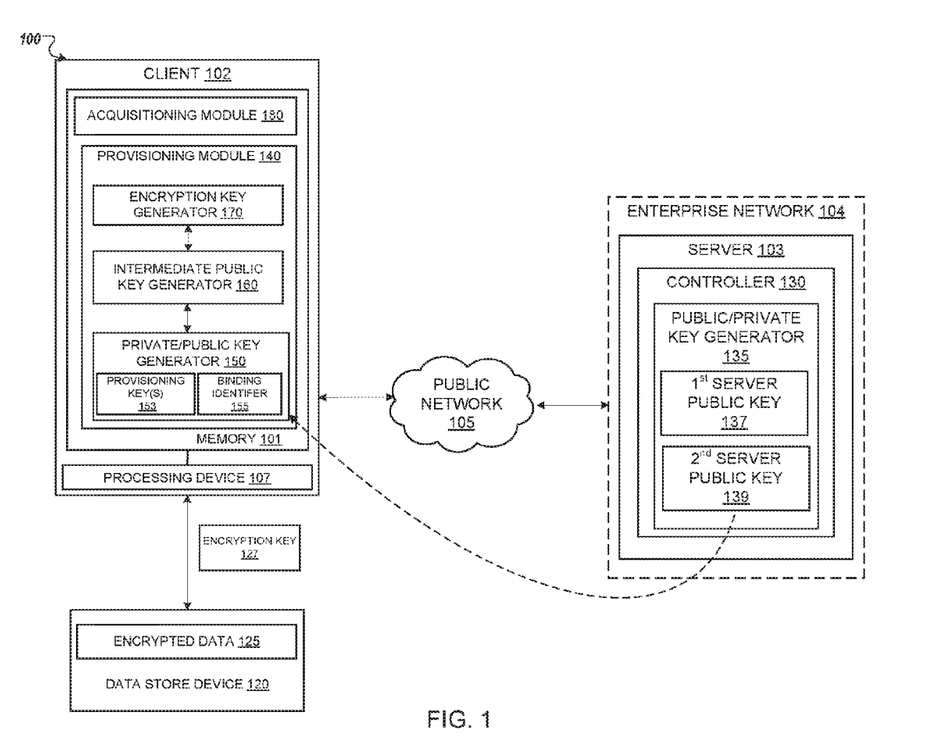
FIG. 1 depicts a block diagram of an example of a cryptographic system in accordance with one or more aspects of the disclosure.

FIG. 1 depicts a block diagram of an example of a cryptographic system 100 in accordance with one or more aspects of the disclosure. The cryptographic system 100 may include one or more computer devices, such as client device 102 and server device 103, interconnected by one or more networks 104 and 105, such as a Local Area Network (LAN), an intranet, an extranet, or the Internet. As used herein, a "client device" refers to a computing device including one or more processing device 107, one or more memory devices 101, and one or more communication interfaces, such as for communication over the networks 104 and 105.

As used herein, a "processing device" refers to a device capable of executing instructions encoding arithmetic, logical, or 110 operations. In one implementation, the processing device 107 may follow Von Neumann architectural model and may include an arithmetic logic unit (ALU), a control unit, and a plurality of registers. In further implementations, the processing device 107 may be a single core processor that is typically capable of executing one instruction at a time (or process a single pipeline of instructions), or a multi-core processor that may simultaneously execute multiple instructions. In another implementation, the processing device 107 may be implemented as a single integrated circuit, two or more integrated circuits, or may be a component of a multi-chip module (e.g., in which individual microprocessor dies are included in a single integrated circuit package and hence share a single socket). A "memory device" herein shall refer to a volatile or non-volatile memory device 102, such as RAM, ROM, EEPROM, or any other device capable of storing data. A "communication interface" herein shall refer to circuitry or device communicatively coupled to one or more processors and capable of routing data between the processors and one or more external devices.

Referring to FIG. 1, the cryptographic system 100 may include a client device 102 that can be operatively connected to an enterprise network 104 via a public network 105 (e.g., Internet). The client device 102 may be a computing device such as a computer, a tablet, or a smart phone on which a user of the client device may have established an account. In some implementations, the user may log into an account associated with the enterprise network 104 by providing certain credentials (such as a matching pair of a user identifier and a password) associated with the user identifier. The client device 102 may further establish a secured communication channel with the enterprise network 104 via the public network 105 according to certain protocols.

The enterprise network 104 may include physical servers (e.g., server device 103) and/or virtual machines, raw and file-based storage, routers, firewalls, and/or load balancers interconnected by two or more LANs. In some implementations, enterprise network 104 may include an internal network. In other implementations, enterprise network 104 may include various other network topologies, including two or more internal networks and/or one or more de-military zone (DMZ) networks, etc.

In some implementations, client device 102 may be coupled to a data store device 120. In one implementation, the data store device 120 may be part of the client device 102. For example, the data store device 120 may be part of the memory 101. The data store device 120 may be a device that serves data stored thereon to client device 102. The data stored on data store device 120 can be application programs and data associated with these applications programs. In one implementation, for security reasons, an encrypted portion of data store device 120 may be used to store encrypted data 125.

In one illustrative example, the client device 102 may be a laptop with encrypted data 125 that utilizes the encryption key 127 to decrypt the data. Data encryption includes a process of converting data (e.g., plain text data) into encrypted data 125 (e.g., cipher-text) using an encryption key, such as encryption key 127, to scramble the data (or cipher) so that it is incomprehensible to human readers. The encryption can be achieved with various types of encryption schemes for data encryption, including, for example, the Advanced Encryption Standard (AES) scheme. In some implementations, the encrypted data 125 may be converted back to the original data through a decryption process using the same encryption key 127. The restored data may be stored in a memory (e.g., memory 101) associated with the client device without storing it back in the data store device 120. The client device 102 may be configured to interface with the data store device 120 to activate the encryption/decryption process for the encrypted data 125 using the encryption key 127.

Implementations of the disclosure protect the encrypted data 125 such that the client device 102 is able to recover an encryption key, such encryption key 127, when the client device 102 is in the presence of server device 103. For example, the presence of the server device 103 on network 104 may be indicated when the server 103 performs certain steps, such as calculate a intermediate public key, on behalf of the client 102. In some implementations, the client device 102 is able to recover the encryption key 127 when the client is in the presence of service device 103.

In other implementations, the client device 102 is able to recover the encryption key 127 when the client is on a particular network segment associated with the server device 103. For example, one or more firewalls may be used to segment networks in order to monitor network traffic associated with the server device 103. In some implementations, the client device 102 may issue an instruction to access the server device 103 via a network segment or network, such as network 104. In response, the client device 102 receives an indication as to whether the access succeeded or failed. If the client device 102 the access to the server device 103 succeeds, this indicates the presence of the server device 103. Still further, other techniques may be used to identify that the client device 102 is in the presence of the server device 103.

In some implementations, server device 103 may be a communications device, such as third-party Bluetooth beacon or other types of communications devices, associated with the enterprise network 104. One example of a communications device may include a Bluetooth beacon that emits a lower power signal a determined distance within a certain GHz frequency band. The server device 103 may include a controller 130 to transmit data (e.g., a plurality of bits) to the client device 102. In some implementations, the client device 102 may include circuitry and various sensors to receive the transmitted signal from the server device 103.

In some implementations, the server device 103 may comprise a private/public key generator 135 to generate public and private keys. For example, the server device 103 may compute a first server public key 137 and a second server public key 139 by executing private/public key generator 135. In one implementation, the first server public key 137 ($r$) may be based on a private key (R) and the second server public key 139 (*e*) may be based on another private key (E) using the following formulas:

$$r = g^R$$

$$e = g^E$$

where operator "^" indicates a group operator, such as a point multiplier as in elliptic curve cryptographic (ECC) (although other group operators are possible), "r" is the first server public key 137 and "e" is the second server public key 139. First server public key 137, r, and second server pubic key 139, e, may both be derived from "g", which is based on a generator value (e.g., of an elliptic curve group), and "R" and "E", respectively, which are private (e.g., session) key values (e.g., random numbers).

In some implementations, "g" is public constant based on a primitive root modulo p operation, where p is also a public constant, such as a prime number (e.g., a large number of at least 512 bits) that is not kept secret and can be shared with the client device 102. For example, the client device 102 and server device 103 may agree on public constants "g" and "p." In other implementations, "g" may be determined by executing an ECC generator that may select a point on an elliptic curve to generate a random number. For example, an elliptic curve is a mathematical structure that is used to generate a verifiable random number. Still further, other techniques may be used to generate "g."

In accordance with implementations of the disclosure, the server device 103 may make the generated first and second server public keys 137 and 139 available to be received by the client device 102 using various techniques. In one implementation, an Internet transport protocol (e.g., TCP/IP or UDP) may specify how the server public keys 137 and 139 are to be transmitted over the network 104 to client device 102. In another implementation, the server device 103 may publish the server public keys 137 and 139 on the network 104 so that the client device 102 may receive them using a certain Internet protocol. In yet another implementation, the server device 103 may store the server public keys 137 and 139 in a data store associated with network 104 so that the client device 102 can later retrieve them. The server public keys 137 and 139 do not contain any sensitive key data, thus the keys do not have to be protected from being accessed by an unauthorized party.

Upon receiving the server public keys 137 and 139, the provision module 140 of client device 102 also computes client-provisioning keys 153 using private/public key generator 150. For example, the processing device 107 may execute the private/public key generator 150 of the provision module 140 to compute client-provisioning keys 153 pairs (a, A) and (b, B) based on the following formulas:

$$a = g^A$$

$$b = g^B$$

where operator "^" indicates a group operator, such as a point multiplier as in ECC (although other group operators are possible), "a" and "b" are client-provisioning keys 153 that are derived from "g" (which is a generator value) and "A" and "B", respectively, which are private (e.g., session) key values (e.g., random numbers). In some implementations, g is public constant based on a primitive root modulo "p" operation where p is the prime number shared with the server device 103. For example, as discussed above, the client device 102 and server device 103 may agree on public constants "g" and "p."

Using client-provisioning key (b) 153, the private/public key generator 150 may generate binding identifier 155. The binding identifier 155 may be a unique identifier that is associated with an access of data, such as encrypted data 125, by the client device 102. In one implementation, the binding identifier 155 may generated be based on the following formula:

$$id = H(b)$$

where id is binding identifier 155 derived from a hashing function, H, that takes client provisioning public key (b) as input. For example, the hashing function H may be a cryptographic hash function that takes a key as input and computes a hash value based on the key. In some implementations, the hashing function H may take as input other type of data (e.g., a constant value) that is known to both the client device 102 and server device 103.

Using the client provisioning public key (b), the client device 102 then calculates a client intermediate public key. For example, the processing device 107 of client device 102 may execute intermediate public key generator 160 to generate a client intermediate public key (q) based on the following formula:

$$q = e^B$$

where operator "^" indicates a group operator, such as a point multiplier as in ECC (although other group operators are possible), "q" is the client intermediate public key, "e" is server public key, such as server public key 139, and "B" is the private key value (e.g., a random number) generated by the client.

Thereupon, the client device 102 calculates an encryption key, such as encryption key 127, using encryption key generator 170. For example, the processing device 107 may execute the encryption key generator 170 to compute encryption key 127 based on the following formula:

$$K = r^A * r^B$$

where operator "^" indicates a group operator, such as a point multiplier as in ECC (although other group operators are possible), operator "*" is a multiplier, "K" is the encryption key 127, "r" is a server public key, such as the first server public key 137 from server device 103, "A" and "B" are the private key values generated by the client device 102 as discussed above.

The client device 102 uses the encryption key 127 to generate the encrypted data 125 stored on the data store device 120. In some implementations, the client device 102 may retain the encryption key 127 for a period of time, even when that use of the encryption key 127 continues outside of the presence (e.g., off the certain network 104) of server device 103. If the client device 102 moves outside of the presence of the server device 103 or off of the network 104 associated with the server device 103, the client device 102 is not able to access the encrypted data 125 because it is not be able to recover the encryption key 127. After a period of time, the client device 102 may discard the encryption key 127, the private key values "A" and "B", and provisioning public key (b), but retains certain information, such as first server public key(r) 137 and the second server public key(e) 139 associated with the server device 103, provisioning public key(a) 153, binding identifier (id) 155, and intermediate public key(q). For example, the client device 102 may store this information in memory 101. In other implementations, the client device 102 may store a type of reference or address pointer to the information rather than the information itself.

In some implementations, client device 102 may be triggered for an acquisition of the encrypted data 125. For example, the processing device 107 of the client device 102 may execute the acquisitioning module 180 to recover the encryption key 127 in response to the server device 103 performing certain steps on behalf of the client device 102. The client device 102 can then use the recovered encryption key 127 to access the encrypted data 125. The acquisitioning module 180 can exist in a fewer or greater number of modules than what is shown in FIG. 1. The module 180 may be operable in conjunction with the cryptographic system 100 to send and receive relevant information to recover the encryption key 127 for decrypting encrypted data 125 as discussed in more detail below with respect to FIG. 2.

Figure 2:
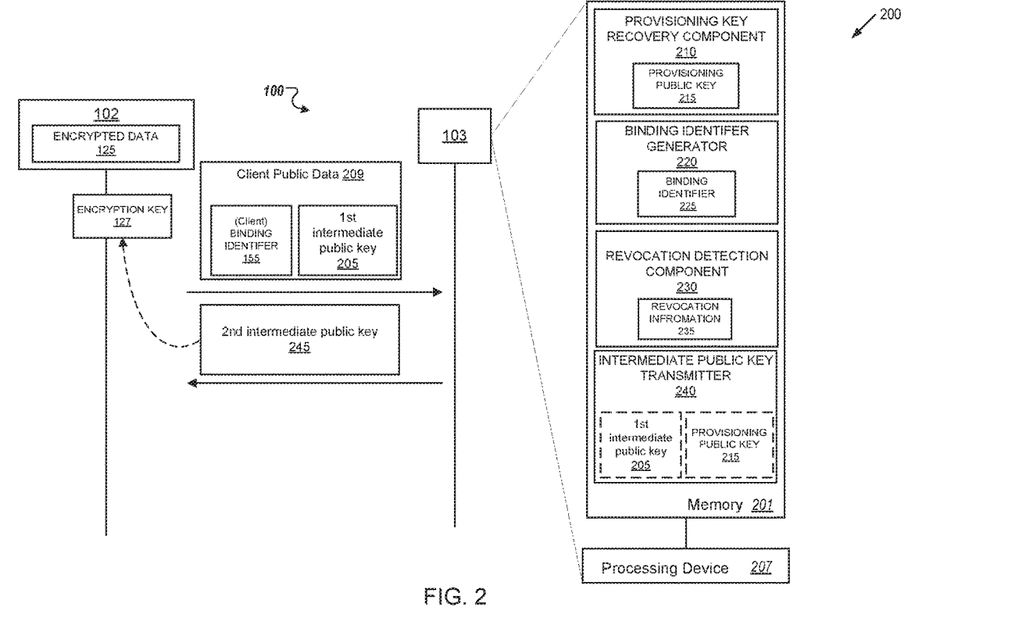
FIG. 2 depicts is another view of the cryptographic system of FIG. 1 in accordance with one or more aspects of the disclosure.

FIG. 2 depicts is another view 200 of the cryptographic system 100 of FIG. 1 in accordance with one or more aspects of the disclosure. As shown, the cryptographic system 100 includes client device 102 and server device 103 in communication with each other, for example, via network 104. In this example, server device 103 includes a memory 201 (similar to memory 101 of FIG. 1) and processing device 207 (similar to the processing device 107 of FIG. 1). The processing device 207 may execute instructions stored in the memory 201 for carrying out the operations of the modules of the server device 103. These modules may include, for example, a provisioning key recovery component 210, a binding identifier generator 220, a revocation detection component 230 and an intermediate public key transmitter 240. Instructions to execute the provisioning key recovery component 210, binding identifier generator 220, revocation detection component 230 and the intermediate public key transmitter 240 may be stored in memory 201 and utilized by processing device 207 for execution of the respective components 210-240. The modules may be operable in conjunction with the client device 102 to send and receive relevant information for the recalculation of the encryption key 127.

In some implementations, after recalculating the encryption key 127, the client device 102 may retain the encryption key 127 for a period of time or discard the key 127 after accessing the encrypted data 125. If the encryption key 127 is discarded, it may be necessary for the client device 102 to re-calculate the encryption key 127 again before the encrypted data 125 can be accessed.

To recalculate the encryption key 127, the client device 102 first calculates a public/private pair, for example, using the private/public key generator 150 of FIG. 1. For example, the client device 102 may compute a client public key (x) based on a private key (X) using the following formula:

$$x = g \char`\^ X$$

where operator "^" indicates a group operator, such as a point multiplier as in ECC (although other group operators are possible), "x" is the client public key a derived from "g", which is based on a generator value (e.g., of an elliptic curve group), and "X" which is a private (e.g., session) key value, such as a random number.

Using the public key (x), the client device 102 then calculates a first intermediate public key 205. For example, the client device 102 may execute the intermediate public key generator 160 of FIG. 1 to generate the first intermediate public key 205 based on the following formula:

$$y = a * x$$

where operator "*" indicates a group operator, such as a point addition as in ECC (although other group operators are possible), "y" is the first intermediate public key 205, "a" is client provisioning public key, such as one of the provisioning public keys 153 previously generated by the client, and "x" is the client public key. The client may then transmit client public data 209, which may include the first intermediate public key 205, the binding identifier 155 and intermediate public key(q) that was calculated by the client device when the encrypted data 125 was provisioned, to the server device 103.

In some implementations, the processing device 207 of server device 103 may execute provisioning key recovery component 210 in response to receiving the client public data 209 from the client 102 that is storing the encrypted data 125. Upon receiving the receiving the client public data 209, the provisioning key recovery component 210 recovers client-provisioning public key (b) 215 based on a calculation using the following formula:

$$b = q \char`\^ (E \char`\^ (-1))$$

where operator "^" indicates a group operator, such as a point multiplier as in ECC (although other group operators are possible), "b" is the recovered client-provisioning public key 215, "q" is the intermediate public key calculated by the client device when the encrypted data 125 was provisioned, and "E" is a private key associated with the server device 103.

Using the recovered client-provisioning public key(b) 215, the server device 103 may then execute the binding identifier generator 220 to create binding identifier 225. The binding identifier 225 is used to confirm that the binding identifier 155 transmitted in the client public data 209 is valid and associated with the correct client device. In some implementations, the binding identifier generator 220 may compute binding identifier 225 based on the following formula:

$$id = H(b)$$

where id is binding identifier 225 derived from a hashing function that takes the recovered client-provisioning public key (b) 215 as input. For example, the hashing function may be a cryptographic hash function that takes a key as input and computes a hash value based on the key. In some implementations, the hashing function H may take as input other type of data (e.g., a constant value) that is known to both the client device 102 and server device 103.

In some implementations, the server device 103 may then confirm whether the (client) binding identifier 155 transmitted by the client device 102 corresponds to the server-calculated binding identifier 225. In alternative implementations, the server device 103 may not confirm whether (client) binding identifier 155 corresponds to the server-calculated binding identifier 225, but rather just confirm that the server-calculated binding identifier 225 is not revoked. For example, the client device 102 may not include the (client) binding identifier 155 in the client public data 209 transmitted to the server device 103. In cases when (client) binding identifier 155 is transmitted, the binding identifier generator 220 may compare the binding identifiers to each other. Responsive to detecting that the received (client) binding identifier 155 does not correspond to the generated binding identifier 225, the server device 103 may generate an alert indicting that the client device 102 is invalid. Otherwise, the server device 103 confirms that the generated binding identifier 225 is not on a revocation list or blacklist.

The revocation detection component 230 may determine whether access to the encrypted data associated with the binding identifier 225 is revoked or allowed in view of the revocation information 235. In some implementations, the revocation information 235 may include a list of identifiers (e.g., binding identifiers) of client devices in which access to some encrypted data, such as encrypted data 125, has been revoked. For example, the revocation information may be a data structure (e.g., a database table) comprising a plurality of identifiers of client devices in which access rights have been revoked. Although revocation information 235 is shown as part of the service device 103, the revocation information 235 may be in a database separate from the server device 103, or some combination thereof. The plurality of identifiers associated with the revocation information 235 may be updated by receiving a user request, for example, via an interface, to add or remove a binding identifier, such as binding identifier 225, for client device 102.

The revocation detection component 203 may determine whether the binding identifier 225 for client device 102 is revoked by comparing the identifier 225 to each of the identifiers of the plurality of identifiers within the revocation information 235. If the binding identifier 225 is in the revocation information 235, the server device 103 may generate another type of alert indicting the client device's ability to recalculate the encryption key 127 to access the encrypted data is denied. Responsive to determining that the binding identifier 225 associated with the client device 102 is not revoked (e.g., allowed), the service device 103 may provide a second intermediate public key 245 for the client device to derive the encryption key 127 to access the encrypted data 125.

Intermediate public key transmitter 240 of the service device 103 may transmit the second intermediate public key 245 to the client device 102. For example, the intermediate public key transmitter 240 may first compute the second intermediate public key 245 based on the following formula:

$$z=(y*b)\hat{\ }R$$

where operator "^" indicates a group operator, such as a point multiplier as in ECC (although other group operators are possible), operator "*" indicates a group operator, such as a point addition as in ECC, "z" is the second intermediate public key 245 which is derived from "y" (which is the first intermediate public key 205), "b" (which is the recovered client-provisioning public key (b) 215) and "R" (which is a private key value that was generated by the server device 103 using the public/private key generator 135 of FIG. 1). Thereafter, the server device 103 transmits the second intermediate public key 245, for example, using network 104 to the client device 102.

In some implementations, the client device 102 in response to receiving the transmitted second intermediate public key 245 may be triggered to recreate the encryption key 127 based on the following formula:

$$K=z/(r\hat{\ }X)$$

where operator "^" indicates an exponentiation operation, operator "/" indicates a group operator, such as a point subtraction as in ECC, "K" is the encryption key 127 derived from a combination of "z" (which is the second intermediate public key 245), "r" (which is the server public key 137), and "X" (which is the private key value generated by the client device 102 using the public/private key generator 150 of FIG. 1).

Once the encryption key 127 is recreated, the client device can then access the encrypted data 125. For example, the client device may use the encryption key 127 to decrypt the encrypted data 125. In some implementations, the client device 102 may retain the encryption key 127 for a period of time or discard the key 127 after accessing the encrypted data 125. If the encryption key 127 is discarded, it may be necessary for the client device 102 to re-calculate the encryption key 127 again before the encrypted data 125 can be accessed. For example, the client device 102 may re-execute the operations disclosed herein for the acquisition of encrypted data 125 when the client device is again in the presence server device 103.

Figure 3:
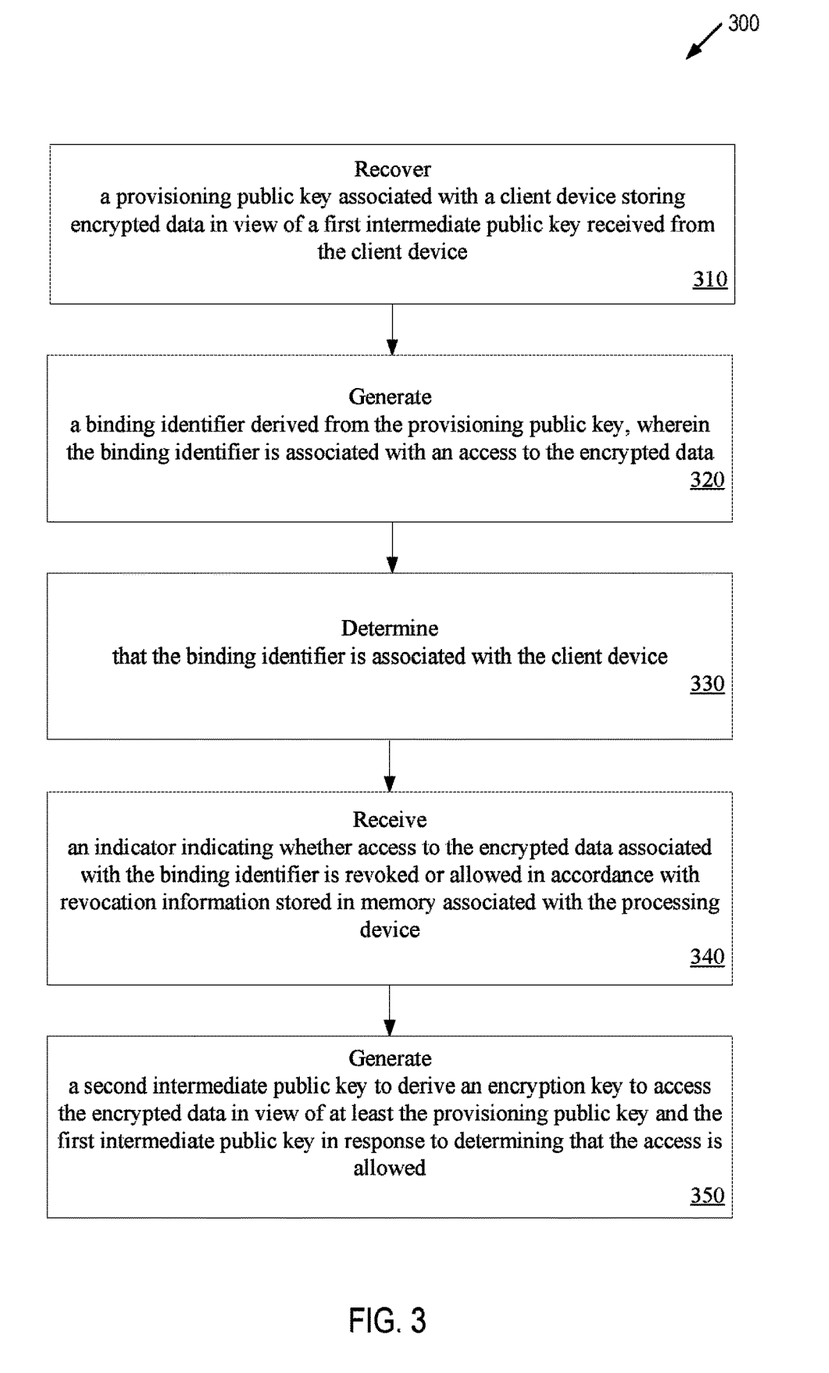
FIG. 3 depicts a flow diagram of a method for accessing encrypted data in accordance with one or more aspects of the disclosure.

FIG. 3 depicts a flow diagram of a method 300 for accessing encrypted data in accordance with one or more aspects of the disclosure. In one implementation, the processing device 107 of FIG. 1 and FIG. 2 may perform method 300. The method 300 may be performed by processing logic that may comprise hardware (circuitry, dedicated logic, etc.), software (e.g., software executed by a general purpose computer system or a dedicated machine), or a combination of both. In alternative implementations, some or all of the method 300 may be performed by other components of a shared storage system. It should be noted that blocks depicted in FIG. 3 can be performed simultaneously or in a different order than that depicted.

Method 300 begins at block 310 where a provisioning public key associated with a client device storing encrypted data is recovered in view of a first intermediate public key received from the client device. In block 320, a binding identifier derived from the provisioning public key is generated. The binding identifier is associated with an access to the encrypted data. It is determined that the binding identifier is associated with the client device in block 330. An indicator is received in block 340 indicating whether access to the encrypted data associated with the binding identifier is revoked or allowed in accordance with revocation information stored in memory associated with the processing device. In block 350, second intermediate public key to derive an encryption key to access the encrypted data is generated in view of at least the provisioning public key and the first intermediate public key in response to determining that the access is allowed.

Figure 4:
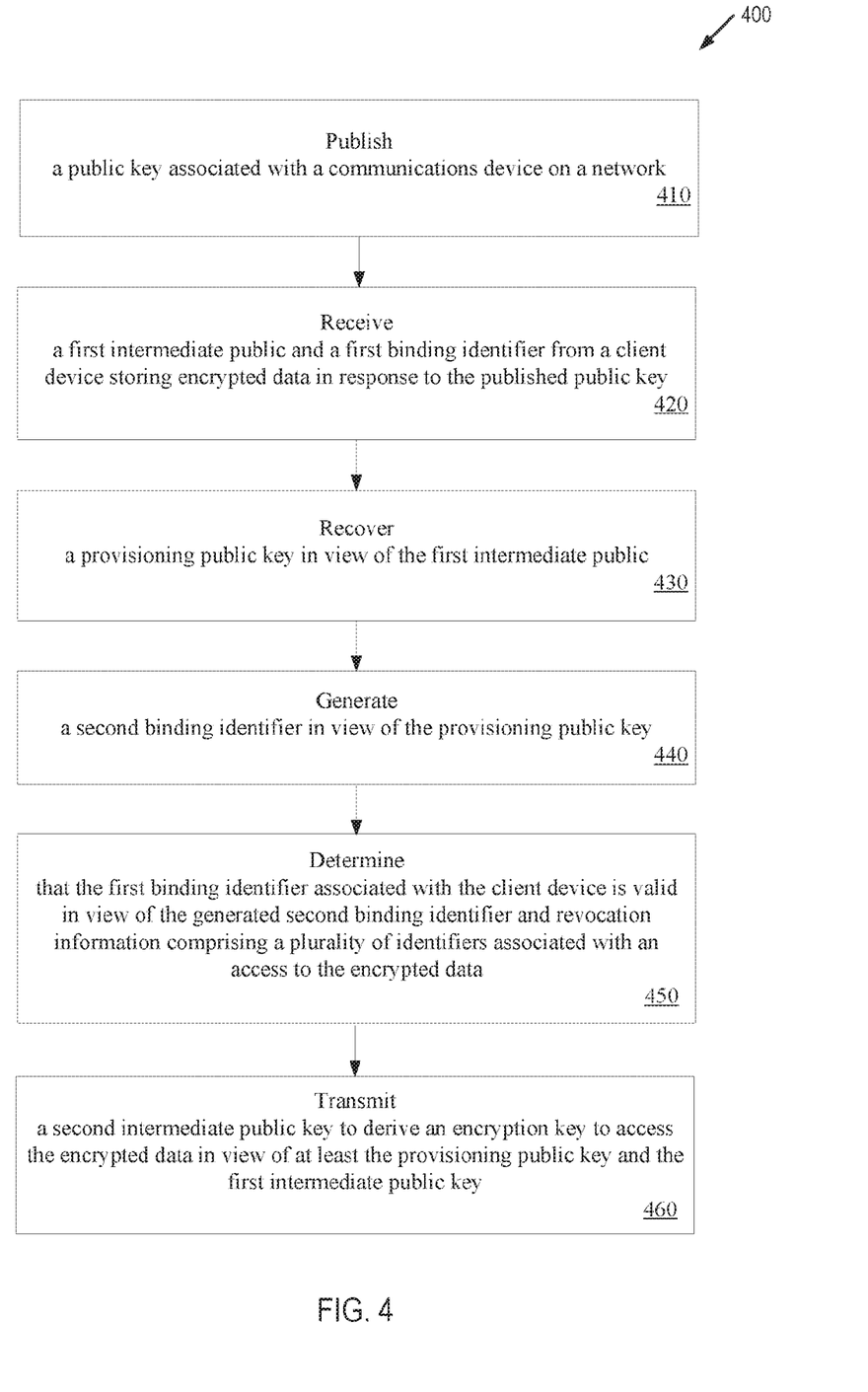
FIG. 4 depicts a flow diagram of another method for accessing encrypted data in accordance with one or more aspects of the disclosure.

FIG. 4 depicts a flow diagram of another method 400 for accessing encrypted data in accordance with one or more aspects of the disclosure. In one implementation, the processing device 107 of FIG. 1 and FIG. 2 may perform method 400. The method 400 may be performed by processing logic that may comprise hardware (circuitry, dedicated logic, etc.), software (e.g., software executed by a general purpose computer system or a dedicated machine), or a combination of both. In alternative implementations, some or all of the method 400 may be performed by other components of a shared storage system. It should be noted that blocks depicted in FIG. 4 can be performed simultaneously or in a different order than that depicted.

Method 400 begins at block 410 where a public key associated with a communications device is published. In block 420, a first intermediate public and a first binding identifier are received from a client device storing encrypted data in response to the published public key. A provisioning public key in recovered in view of the first intermediate public in block 430. A second binding identifier is generated in view of the provisioning public key in block 440. In block 450, is it determined that the first binding identifier associated with the client device is valid in view of the generated second binding identifier and revocation information. The revocation information comprising a plurality of identifiers associated with an access to the encrypted data. In block 460, a second intermediate public key to derive an encryption key to access the encrypted data is transmitted in view of at least the provisioning public key and the first intermediate public key.

Figure 5:
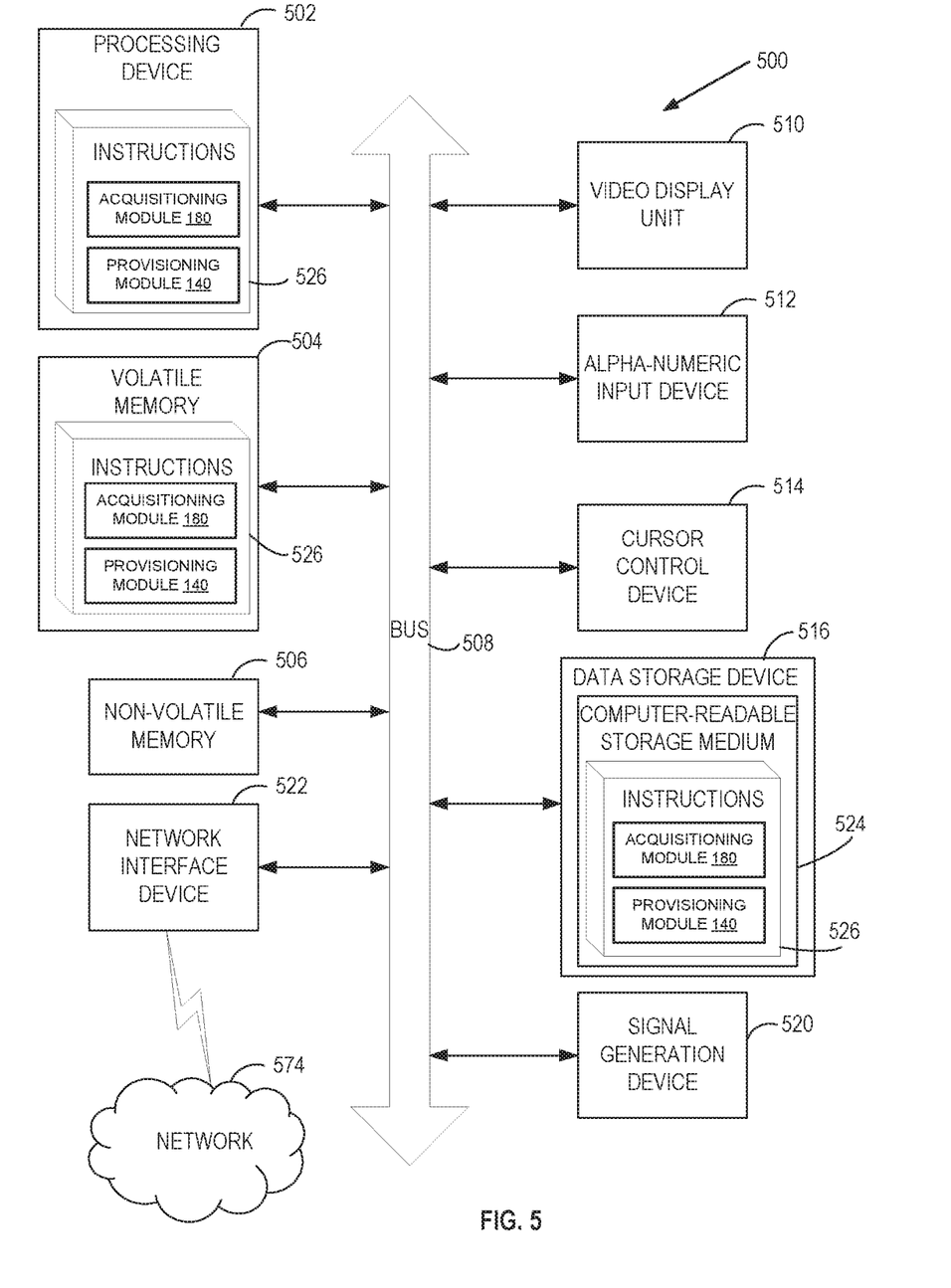
FIG. 5 depicts a block diagram of an illustrative computing device operating in accordance with the examples of the disclosure.

FIG. 5 depicts a block diagram of an illustrative computing device operating in accordance with the examples of the disclosure. In various illustrative examples, computer system 500 may correspond to a processing device within system 100 of FIG. 1 and FIG. 2. In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for binding data to a network in the presence of an entity.

In a further aspect, the computer system 500 may include a processing device 502 (which may correspond to processing device 107), a volatile memory 504 (e.g., random access memory (RAM)), a non-volatile memory 506 (e.g., read-only memory (ROM) or electrically-erasable programmable ROM (EEPROM)), and a data storage domain 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage domain 516 may include a non-transitory computer-readable storage medium 524 on which may store instructions 526 encoding any one or more of the methods or functions described herein, including instructions encoding the techniques including the provisioning module 140 and acquisitioning module 180 of FIG. 1 for implementing method 300 of FIG. 3 or method 400 of FIG. 4 for the provision/acquisition of encrypted data upon the detection of a communications device.

Instructions 526 may also reside, completely or partially, within volatile memory 504 and/or within processing device 502 during execution thereof by computer system 500, hence, volatile memory 504 and processing device 502 may also constitute machine-readable storage media.

While non-transitory computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, firmware modules or functional circuitry within hardware devices may implement the methods, components, and features of the disclosure. Further, the methods, components, and features may be implemented in any combination of hardware devices and computer program components, or in computer programs.

Unless specifically stated otherwise, terms such as "identifying," "determining," "encrypting," "decrypting," "associating," "receiving," "producing," "receiving," "detecting" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and 400 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A cryptographic system comprising:
a memory to store revocation information comprising a plurality of identifiers; and
a processing device, operatively coupled to the memory, to:
recover a provisioning public key in view of a first intermediate public key associated with a client device storing encrypted data;
generate a binding identifier for the client device in view of the provisioning public key;

determine whether access to the encrypted data associated with the binding identifier is revoked or allowed in view of the revocation information; and responsive to determining that the access is allowed, provide a second intermediate public key to derive an encryption key to access the encrypted data using at least the provisioning public key and the first intermediate public key.

2. The cryptographic system of claim 1, wherein the processing device is further to responsive to determining that the access is revoked, generate an alert indicting that access to the encrypted data is denied.

3. The cryptographic system of claim 1, wherein the processing device is further to transmit the second intermediate public key to the client device, and wherein the client device to produce the encryption key responsive to transmitting the second intermediate public key.

4. The cryptographic system of claim 1, wherein the processing device is further to receive the first intermediate public key from the client device over a network associated with the cryptographic system.

5. The cryptographic system of claim 1, wherein the processing device is further to:
receive a second binding identifier associated with the client device; and
determine whether the second binding identifier corresponds to the generated binding identifier.

6. The cryptographic system of claim 5, wherein the processing device is further to responsive to detecting that the second binding identifier does not correspond to the generated binding identifier, generate an alert indicting that the client device is invalid.

7. The cryptographic system of claim 1, wherein the processing device is further to compare the generated binding identifier to each of the identifiers of the plurality of identifiers associated with the revocation information.

8. The cryptographic system of claim 1, wherein the processing device is further to receive a request to update the plurality of identifiers associated with the revocation information with the generated binding identifier for the client device.

9. A method comprising:
recovering, by a processing device, a provisioning public key associated with a client device storing encrypted data in view of a first intermediate public key received from the client device;
generating, by the processing device, a binding identifier derived from the provisioning public key, wherein the binding identifier is associated with an access to the encrypted data; determining that the binding identifier is associated with the client device;
receiving an indicator indicating whether access to the encrypted data associated with the binding identifier is revoked or allowed in accordance with revocation information stored in memory associated with the processing device; and
responsive to determining that the access is allowed, generating, by the processing device, a second intermediate public key to derive an encryption key to access the encrypted data using at least the provisioning public key and the first intermediate public key.

10. The method of claim 9, furthering comprising receiving the second intermediate public key in response to the client device moving onto a network associated with the processing device.

11. The method of claim 9, further comprising transmitting the second intermediate public key to the client device; wherein the client device to produce the encryption key responsive to the transmitting.

12. The method of claim 11, further comprising responsive to detecting that the second binding identifier does not correspond to the generated binding identifier, generating an alert indicting that the client device is invalid.

13. The method of claim 12, further comprising responsive to determining that the access is revoked, generating an alert indicting that access the encrypted data is denied.

14. The method of claim 9, wherein determining that the binding identifier is associated with the client device further comprises:
receiving a second binding identifier associated with the client device; and
determining whether the second binding identifier corresponds to the generated binding identifier.

15. The method of claim 9, further comprising comparing the binding identifier to each of a plurality of identifiers associated with the revocation information.

16. A non-transitory computer readable storage medium, having instructions stored therein, which when executed by a processing device, cause the processing device to:
publish, by the processing device, a public key associated with a communication device on a network;
responsive to publishing the public key, receive a first intermediate public and a first binding identifier from a client device storing encrypted data;
recover a provisioning public key in view of the first intermediate public;
generate a second binding identifier in view of the provisioning public key;
determine that the first binding identifier associated with the client device is valid in view of the generated second binding identifier and revocation information, the revocation information comprising a plurality of identifiers associated with an access to the encrypted data; and
transmit a second intermediate public key to derive an encryption key to access the encrypted data using at least the provisioning public key and the first intermediate public key.

17. The non-transitory computer readable storage medium of claim 13, wherein the client device to produce the encryption key responsive to the transmitted second intermediate public key.

18. The non-transitory computer readable storage medium of claim 13, wherein the processing device is further to determine whether the first binding identifier received from the client device corresponds to the generated second binding identifier.

19. The non-transitory computer readable storage medium of claim 17, wherein the processing device is further to responsive to detecting that the second binding identifier does not correspond to the generated binding identifier, generate an alert indicting that the client device is invalid.

20. The non-transitory computer readable storage medium of claim 13, wherein the processing device is further to: compare the generated second binding identifier to each of the identifiers of the plurality of identifiers associated with the revocation information; and determine whether the generated second binding identifier is revoked in view of the compared.

21. The non-transitory computer readable storage medium of claim 13, receiving a request to update the plurality of identifiers associated with the revocation information with a binding identifier for the client device.

\* \* \* \* \*